United States Patent
Kaye et al.

(10) Patent No.: US 11,297,781 B2
(45) Date of Patent: Apr. 12, 2022

(54) METHOD, APPARATUS, AND SYSTEM FOR CONTROLLING A TIMBER-WORKING DEVICE

(71) Applicant: Waratah NZ Limited, Tokoroa (NZ)

(72) Inventors: Brett James Kaye, Tauranga (NZ); Clinton Charles Marriage, Potosi, WI (US); Michael Francis James, Carlisle (CA); Richard John Lawler, Dubuque, IA (US)

(73) Assignee: Deere & Company, Moline, IL (US)

( * ) Notice: Subject to any disclaimer, the term of this patent is extended or adjusted under 35 U.S.C. 154(b) by 868 days.

(21) Appl. No.: 15/652,959

(22) Filed: Jul. 18, 2017

(65) Prior Publication Data
US 2017/0311558 A1 Nov. 2, 2017

Related U.S. Application Data

(63) Continuation of application No. 14/049,882, filed on Oct. 9, 2013, now abandoned.

(30) Foreign Application Priority Data

Oct. 10, 2012 (NZ) .................................. 602931

(51) Int. Cl.
*A01G 23/02* (2006.01)
*B27G 19/00* (2006.01)
(Continued)

(52) U.S. Cl.
CPC ............ *A01G 23/02* (2013.01); *A01G 23/08* (2013.01); *B27G 19/00* (2013.01); *B27G 21/00* (2013.01)

(58) Field of Classification Search
CPC ...... A01G 23/02; A01G 23/08; A01G 23/081; A01G 23/083; A01G 23/087;
(Continued)

(56) References Cited

U.S. PATENT DOCUMENTS 3,848,647 A * 11/1974 Fell .................... B27C 7/005
144/1.1
3,881,533 A * 5/1975 Savage ............... A01G 23/091
144/24.13
(Continued)

FOREIGN PATENT DOCUMENTS

EP 1476388 B1 7/2009
JP 2012019702 A * 2/2012 .............. B27L 11/00
(Continued)

OTHER PUBLICATIONS

Machine Translation of Kanari et al, JP2012019702(A), Feb. 2012, Hitachi Construction Machinery.*
(Continued)

*Primary Examiner* — Matthew Katcoff (57) ABSTRACT

Method, apparatus, and system for operation of a timber-working device configured to perform at least one operation having an associated hazard zone. At least one signal from at least one orientation sensor associated with the timber-working head may indicate whether a predetermined location is within the hazard zone based on the orientation of the timber-working head. Operation of the timber-working head can be controlled based on the signal.

18 Claims, 5 Drawing Sheets

(51) Int. Cl.
 *A01G 23/08* (2006.01)
 *B27G 21/00* (2006.01)
(58) Field of Classification Search
 CPC .... A01G 23/091; A01G 23/093; A01G 23/00; B27G 21/00; B27G 19/00
 USPC .......................... 144/356, 382–394, 402–404
 See application file for complete search history.

(56) References Cited

U.S. PATENT DOCUMENTS

| | | | | |
|---|---|---|---|---|
| 4,044,806 | A * | 8/1977 | Savage | A01G 23/085 144/24.13 |
| 5,746,261 | A | 5/1998 | Bowling | |
| 5,894,873 | A * | 4/1999 | Weeks | B27L 7/00 144/195.1 |
| 6,021,825 | A | 2/2000 | Bowling | |
| 6,135,175 | A * | 10/2000 | Gaudreault | A01G 23/083 144/336 |
| 6,182,725 | B1 * | 2/2001 | Sorvik | A01G 23/08 144/335 |
| 6,289,957 | B1 * | 9/2001 | Kare | A01G 23/083 144/24.13 |
| 7,320,349 | B2 * | 1/2008 | Gatz | A01G 23/08 144/335 |
| 7,690,407 | B2 | 4/2010 | Annala | |
| 8,836,529 | B2 * | 9/2014 | Thomsen | A01G 23/091 340/686.3 |
| 2008/0055081 | A1 * | 3/2008 | Lea | F16P 3/142 340/555 |
| 2012/0188089 | A1 | 7/2012 | Thomsen | |

FOREIGN PATENT DOCUMENTS

| | | |
|---|---|---|
| JP | 2012019702 A | 2/2012 |
| WO | 2007139878 A3 | 12/2006 |
| WO | 2010146230 A1 | 12/2010 |

OTHER PUBLICATIONS

Search Report issued in corresponding European Application No. 13187125.3, dated Jan. 29, 2014 (8 pages).
First Examination Report issued in corresponding New Zealand Application No. 616526, dated Oct. 23, 2013 (2 pages).
European Search Report in foreign counterpart application No. 17151030.8 dated May 4, 2017 (10 pages).

* cited by examiner

METHOD, APPARATUS, AND SYSTEM FOR CONTROLLING A TIMBER-WORKING DEVICE

This application is a continuation of U.S. patent application Ser. No. 14/049,882, filed on 9 Oct. 2013, which claimed the benefit of New Zealand Patent Application Number 602931 filed Oct. 10, 2012, the entire contents of which are incorporated herein by reference.

FIELD OF THE DISCLOSURE

The present disclosure relates to a method, apparatus, and system for controlling a timber-working device.

BACKGROUND OF THE DISCLOSURE

It is well-known to mount timber-working devices to a carrier vehicle in order to perform a number of operations in connection with timber processing. These operations may include one, or a combination of, grappling and felling a standing tree, delimbing a felled stem, debarking the stem, and cutting the stem into logs—commonly using at least one chainsaw.

A significant hazard associated with timber-working devices including a chainsaw is a phenomenon known as "chain shot". Chain shot results from the saw chain breaking, following which parts from the chain or other portions of the saw assembly are propelled at high velocity from the harvester into the surrounding environment. Other types of saw, such as disc saws, may experience a similar phenomenon whereby the teeth of the saw are propelled from the saw.

Further, many timber-working devices include a drive or feed mechanism in the form of at least one driven roller—for example rollers mounted on grapple arms which grip the stem and control position of the stem relative to the device. The drive mechanism allows the stem to be moved relative to the timber-working device for debarking, delimbing, and cutting. In the course of doing so, the stem may be fed either forward or reverse through the device at upwards of 5 m/s.

SUMMARY

According to an embodiment of the present disclosure there is provided a method for operation of a timber-working device configured to perform at least one operation having an associated hazard zone, the method including the steps of outputting at least one signal from at least one orientation sensor associated with the timber-working head, the signal indicating whether a predetermined location is within the hazard zone based on the orientation of the timber-working head, receiving the signal, and controlling the operation associated with the hazard zone based on the signal.

In another embodiment the method includes determining the orientation of the timber-working device based at least in part on the signal received from the orientation sensor, and determining whether the predetermined location is within the hazard zone based on the orientation of the timber-working head.

According to another aspect of the present disclosure there is provided a timber-working system, including a timber-working device configured to perform at least one operation having an associated hazard zone, at least one orientation sensor configured to output at least one signal indicating whether a predetermined location is within the hazard zone based on the orientation of the timber-working head, and at least one controller configured to receive the signal and control the operation associated with the hazard zone based on the signal. In one embodiment the controller may be a cutout switch or circuit associated with operation of at least one function of the harvester head.

In an embodiment a controller may include at least one processor configured to receive the at least one signal from the at least one orientation sensor associated with the timber-working device, determine the orientation of the timber-working device based at least in part on the signal from the orientation sensor, and determine whether the predetermined location is within the hazard zone based on the orientation of the timber-working device.

According to a further embodiment of the present disclosure there is provided a method for operation of a timber-working device configured to perform at least one operation having an associated hazard zone, the method including the steps of receiving at least one signal from at least one orientation sensor associated with the timber-working device, determining the orientation of the timber-working device based at least in part on the signal from the orientation sensor, and determining whether a predetermined location is within the hazard zone based on the orientation of the timber-working device.

According to another aspect of the present disclosure there is provided an apparatus for use with a timber-working device, the timber-working device configured to perform at least one operation having an associated hazard zone, the apparatus including at least one processor configured to receive at least one signal from at least one orientation sensor associated with the timber-working device, determine the orientation of the timber-working device based at least in part on the signal from the orientation sensor, and determine whether a predetermined location is within the hazard zone based on the orientation of the timber-working device.

According to another aspect of the present disclosure there is provided a timber-working system, including a timber-working device configured to perform at least one operation having an associated hazard zone, at least one orientation sensor configured to output a signal indicating the orientation of the timber-working device, and at least one processor configured to receive at least one signal from the at least one orientation sensor associated with the timber-working device, determine the orientation of the timber-working device based at least in part on the signal from the orientation sensor, and determine whether a predetermined location is within the hazard zone based on the orientation of the timber-working device.

The timber-working device can be a harvester head, and may be referred to as such throughout the specification. Harvester heads typically have the capacity to grapple and fell a standing tree, delimb and/or debark a felled stem, and cut the stem into logs. However, a person skilled in the art should appreciate that the present disclosure may be used with other timber-working devices, for example a feller buncher, debarking and/or delimbing head, disc saw head, saw grapple, and so on—and that reference to the timber-working device being a harvester head is not intended to be limiting.

Further aspects of the present disclosure will become apparent from the drawings and ensuing description which is given by way of example only.

DETAILED DESCRIPTION

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Figure 1:
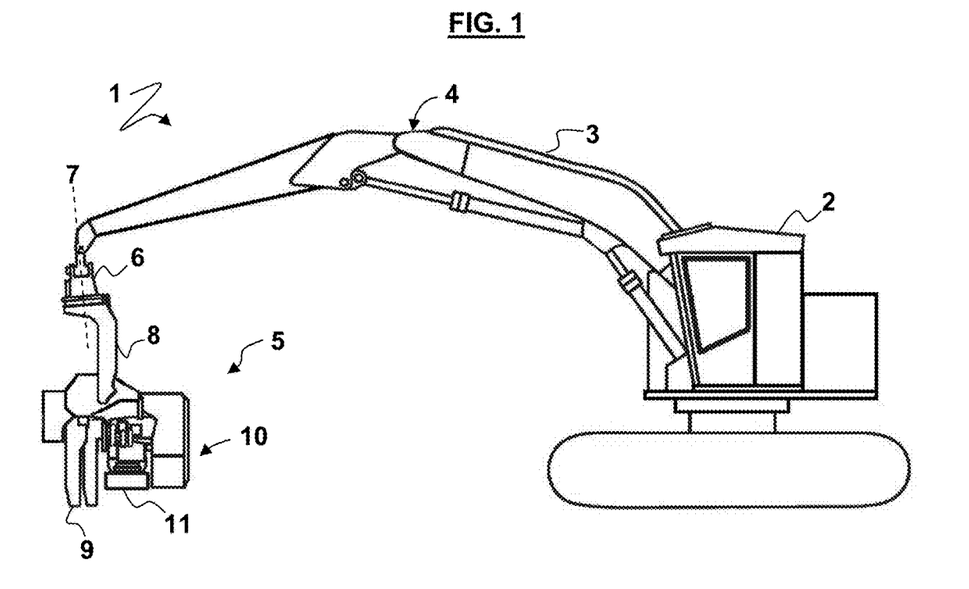
FIG. 1 is a side view of an example timber-working system including, for example, a harvester head according to one aspect of the present disclosure.

FIG. 1 illustrates a timber-working system including a carrier 1 for use in forest harvesting. The carrier 1 includes an operator cab 2 from which an operator (not shown) controls the carrier 1. The carrier 1 further includes an articulated arm 3, which has an articulated joint 4, as well as a further pivot point at the point of connection (not shown) to the carrier 1. A timber-working device in the form of a harvester head 5 is connected to the arm 3 of the carrier 1. Connection of the harvester head 5 to the arm 3 includes a rotator 6, configured to rotate the harvester head about the generally vertical axis of rotation marked by dashed line 7. A tilt bracket 8 further allows rotation of the harvester head 5 between a prone position (as illustrated) and a standing position. The harvester head 5 includes grapple or delimbing arms 9 configured to grasp the stem of a tree (not illustrated), at least one chainsaw at the end marked by arrow 10, and at least one feed roller 11 configured to control the position of the tree relative to the chainsaw 10. The various operations of the harvester head 5 may be controlled by the operator using hand and foot controls as known in the art. Further, certain automated functions of the harvester head 5 may be controlled by a processor.

Figure 2:
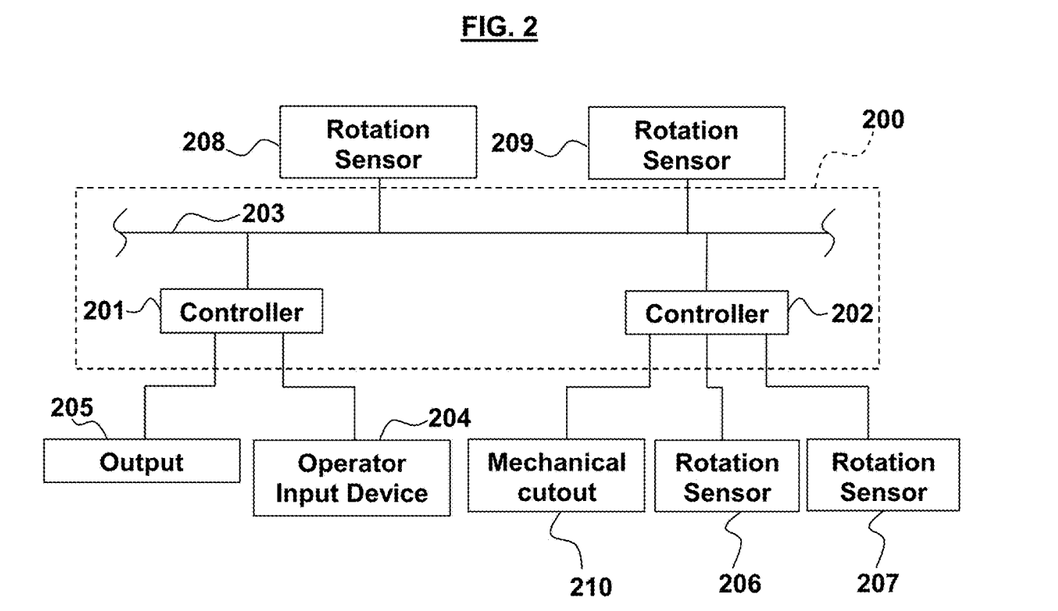
FIG. 2 is a diagrammatic view of an example control system for the timber-working system.

FIG. 2 illustrates an electronic control system (generally indicated by arrow 200) for controlling the carrier 1 and harvester head 5. The control system 200 includes one or more electronic controllers, each controller including a processor and memory having stored therein instructions which, when executed by the processor, causes the processor to perform the various operations of the controller. For example, the control system 200 includes a first controller 201 on board the carrier 1 and a second controller 202 on board the head 5. The controllers 201, 202 are connected to one another via a communications bus 203 (e.g., a CAN bus).

A human operator operates an operator input device 204 located at the operator's cab 2 of the carrier 1 to control the head 5. Details of operation are output to an output device 205—for example a monitor. Certain automated functions may be controlled by first controller 201 and/or second controller 202.

The system 200 includes harvester head orientation sensors—for example a rotation sensor 206 associated with the rotator 6 of FIG. 1, and a rotation sensor 207 associated with the tilt bracket 8 of FIG. 1. The system 200 also includes a carrier arm orientation sensors—for example a rotation sensor 208 associated with the articulated joint 4 of FIG. 1, and a rotation sensor 209 associated with the pivotal connection between the arm 3 and the point of connection to the carrier 1.

The first controller 201 is configured to receive signals output by the respective sensors, and process the data associated with those signals to determine whether the operator cab 2 of FIG. 1 is within a hazard zone associated with the harvester head 5 in a manner which will be described further below. The first controller 201 may then communicate with the harvester head 5 of FIG. 1 to control operation thereof in response to determining that the operator cab 2 is within a hazard zone. A notification of this is also transmitted to monitor 205.

In an alternative embodiment, the second controller 202 is configured to control the harvester head 5 on receiving a signal from the rotation sensor 206 that is only triggered when the orientation of the rotator is within a particular range that corresponds to the operator cab 2 being within a hazard zone. In an example embodiment the controller 202 may control a mechanical cutout 210 to stop operation of the saw 10.

Figure 3A:
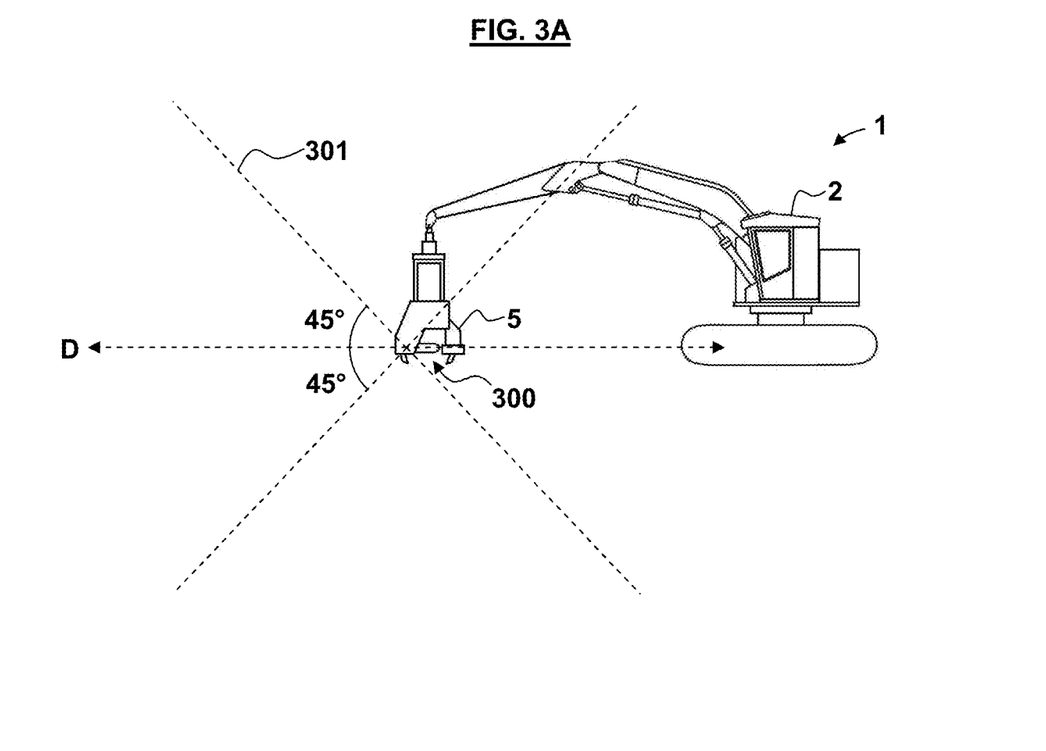
FIG. 3A is a side view of an example timber-working system including, for example, a harvester head showing an embodiment of a hazard zone associated with the harvester head.
Figure 3B:
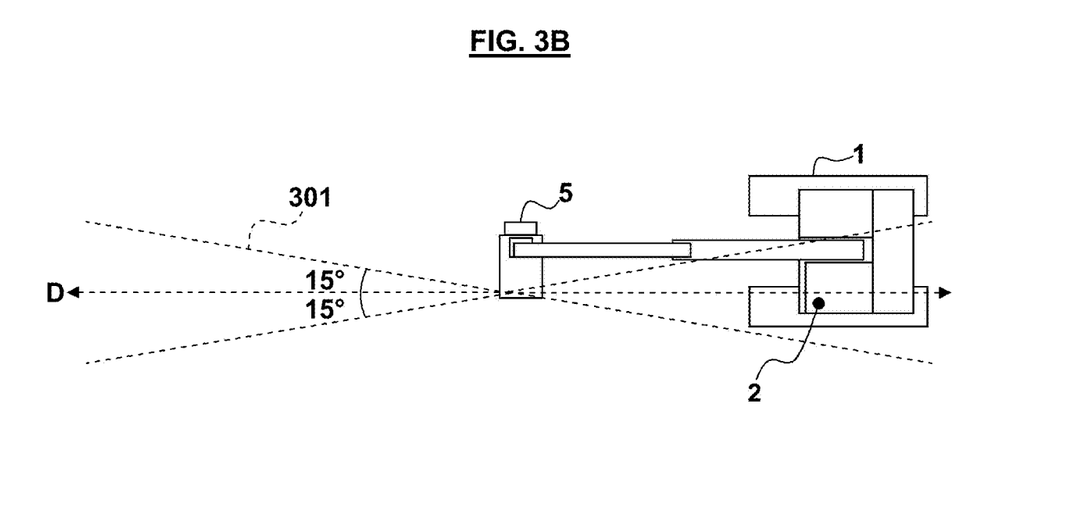
FIG. 3B is an elevated view of the timber-working system.

FIG. 3A and FIG. 3B illustrate the carrier 1 of FIG. 1, with the harvester head 5 rotated about the rotator 6 by 90 degrees in a clockwise direction. The harvester head 5 includes a chainsaw 300 as known in the art. The harvester head 5 has a saw hazard zone indicated by dashed lines 301 centered about the saw drive gear (not shown). As seen in FIG. 3A, the saw hazard zone 301 extends through substantially 90° in the plane aligning with the cutting plane of the saw bar. Referring to FIG. 3B, the saw hazard zone 301 may extend through substantially 30° in the plane extending laterally from the cutting plane. It should be appreciated that the angles described herein are examples, and not intended to be limiting.

The distance D to which the saw hazard zone 301 extends may be determined by the operating speed of the chainsaw, and characteristics of the chain such as pitch or gauge. It may be seen that the operator cab 2 is within the vertical and horizontal elements of the saw hazard zone 301.

Figure 4:
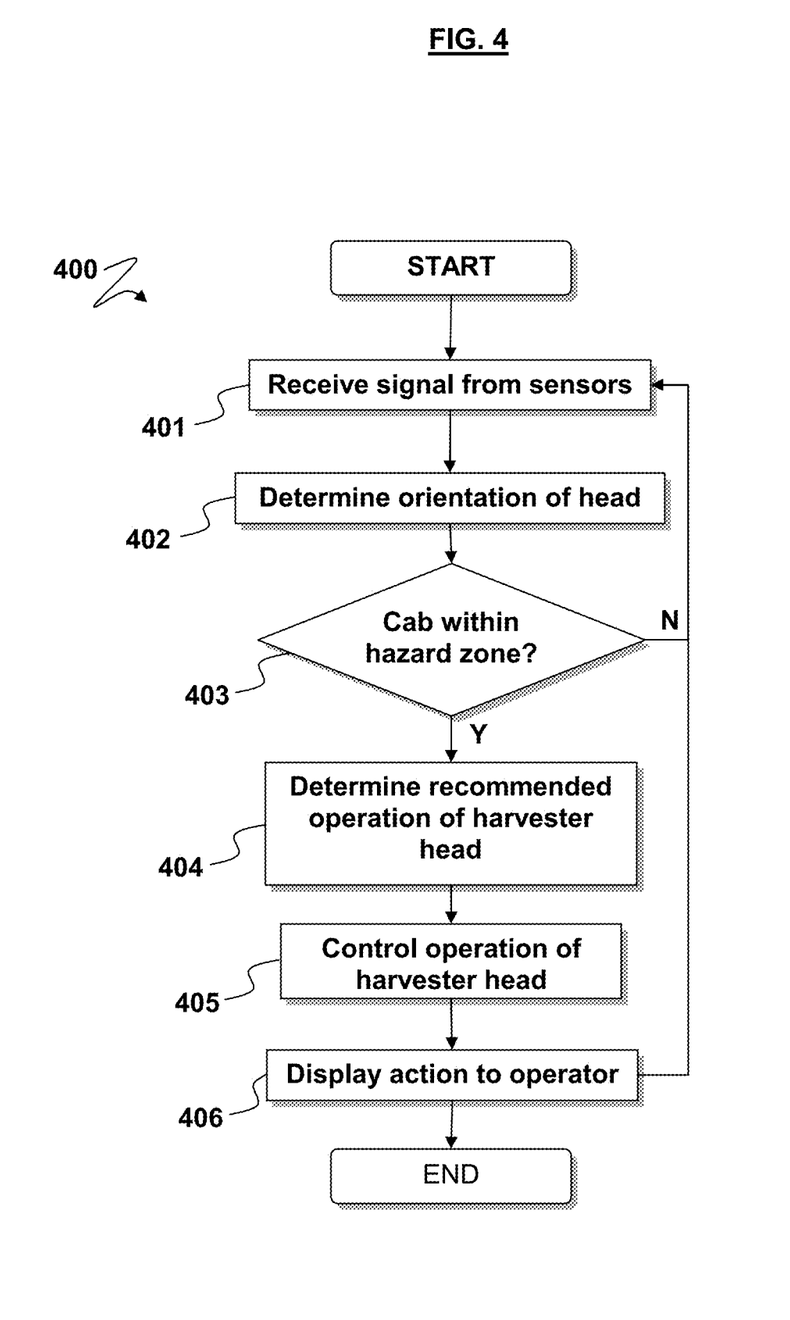
FIG. 4 is a flowchart illustrating a method for operating a timber-working device according to one aspect of the present disclosure.

FIG. 4 illustrates a method 400 for operating a timber-working device—for example harvester head 5. The methods steps will be described with reference to FIG. 1, FIG. 2, FIG. 3B and FIG. 3B. In step 401 the first controller 201 receives data from rotation sensors 206 and 207 associated with the harvester head 5, and rotation sensors 208 and 209 associated with the carrier arm 3. In step 402 the first controller 201 determines the orientation of the harvester head 5 based at least in part on the respective signals from rotation sensors 202, 203, 205, and 206. At step 403 the first controller 201 determines whether the operator cab 2 is within the saw hazard zone 301 associated with operation of the chainsaw 300. If so, in step 404 the first controller 201 looks up a recommended operation for the chainsaw 300 given the presence of the operator cab 2 within the saw hazard zone 301. A recommended operation for such a condition may be to disable operation of the chainsaw. In step 405 the first controller 201 controls operation of the harvester head 5 according to the recommended operation, stopping the chainsaw. In step 406 the execution of the recommended operation, and cause for same, is displayed to the operator of the harvester head 5. The operator may have the option to override the recommended operation—for example by selecting an override option on the monitor 205, or selecting the relevant control more than once (for example selecting a saw activation button twice).

Figure 5:
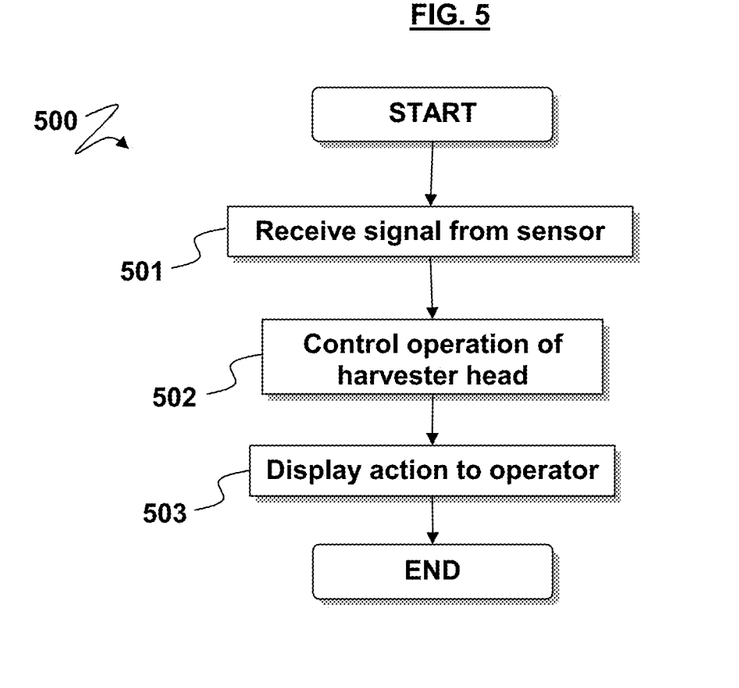
FIG. 5 is a flowchart illustrating another method for operating a timber-working device according to one aspect of the present disclosure.

FIG. 5 illustrates a method 500 for operating a timber-working device—for example harvester head 5. The methods steps will be described with reference to FIG. 1, FIG. 2, FIG. 3A and FIG. 3B. In step 501 the second controller 202 receives a signal from rotation sensor 206 associated with the harvester head 5, indicating that the operator cab 2 is within the saw hazard zone 301. This may be by virtue of the sensor 206 only triggering in a particular orientation of the head 5, or the second controller 202 monitoring rotation of the head 5 and determining that the orientation has been reached. In step 502 the second controller 202 controls operation of the harvester head 5, stopping the chainsaw 300. In step 503 the fact that the chainsaw 300 has been disabled, and cause for same, is displayed to the operator of the harvester head 5. The operator may have the option to override the disablement—for example by selecting an override option on the monitor 5, or selecting the relevant control more than once (for example selecting the saw activation button twice).

Figure 6A:
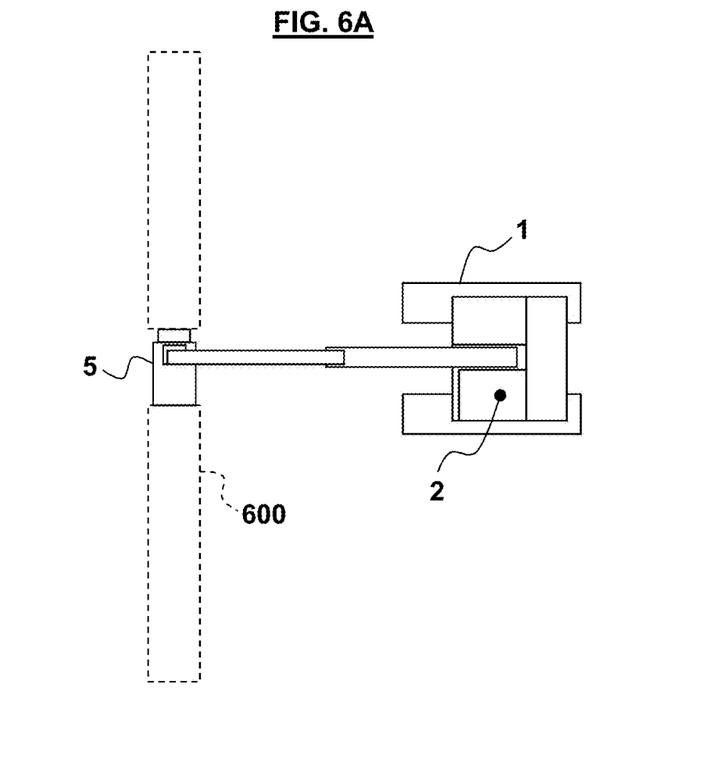
FIG. 6A is a side view of timber-working system including, for example, a harvester head showing a hazard zone associated with a harvester head for processing a tree stem according to another aspect of the present disclosure.

FIG. 6A illustrates the carrier 1 of FIG. 1, with the harvester head 5 rotated about the rotator 6 by 90 degrees in a clockwise direction. In this embodiment the hazard zone illustrated is a feed hazard zone indicated by dashed line 600. The feed hazard zone 600 represents the space within which a stem may be driven by the drive mechanism (including feed rollers 11) of the harvester head 5. The methods described with reference to FIG. 4 or FIG. 5 may be applied to determine whether the drive mechanism should be disabled. In the scenario illustrated, the operator cab 2 is not within the feed hazard zone 600, and operation with regard to the drive mechanism may be permitted as per normal operation.

Figure 6B:
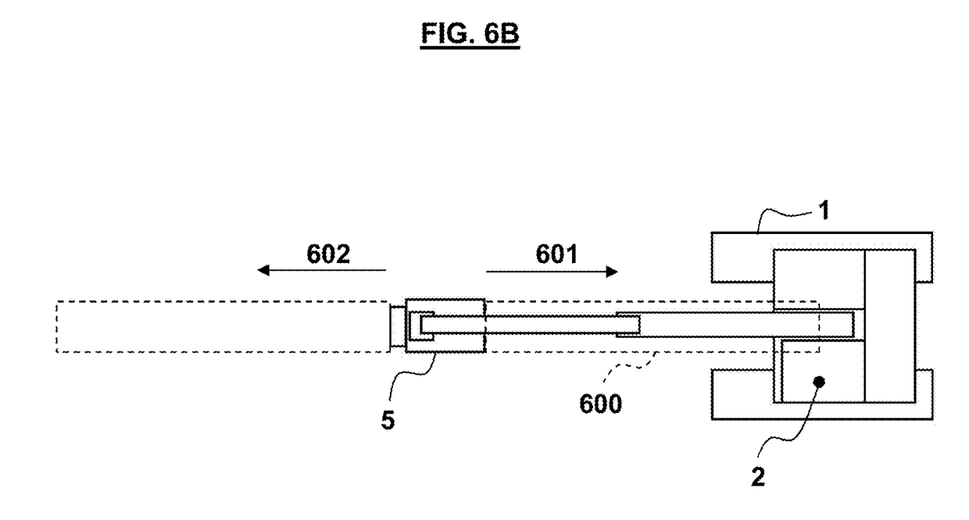
FIG. 6B is an elevated view of the timber-working system.

However, referring to FIG. 6B, if the harvester head 5 was rotated such that the feed hazard zone 600 intersected with the operator cab 2 as illustrated, the drive mechanism would be disabled until this was rectified.

In some embodiments, the drive mechanism may only be disabled in the direction indicated by arrow 601. The operator may be permitted to feed the stem in the direction indicated by arrow 602—i.e. away from the operator cab 2 such that the stem does not present a hazard to the operator.

Figure 7:
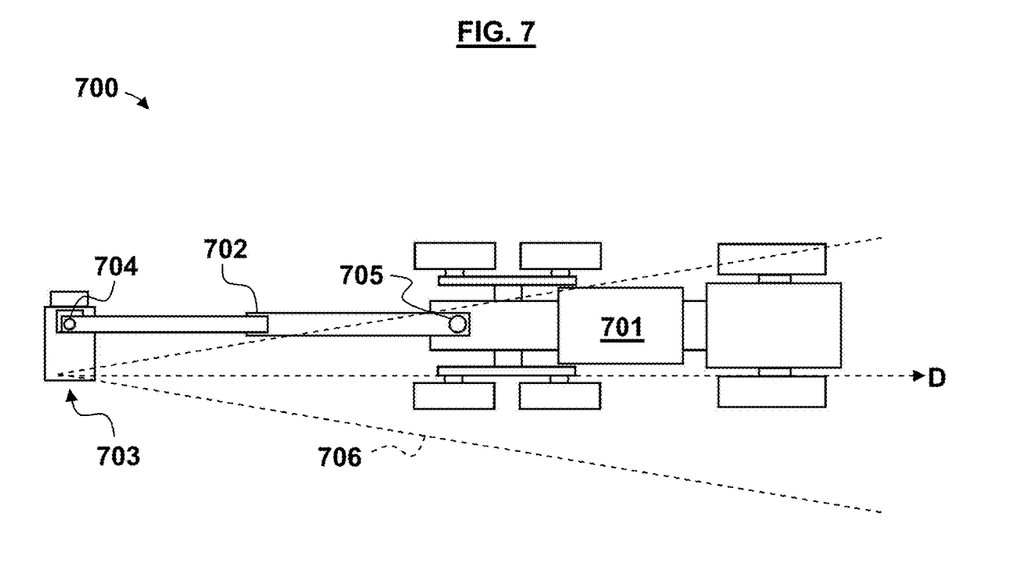
FIG. 7 is an elevated view of an example carrier of a timber-working device according to one aspect of the present disclosure.

FIG. 7 illustrates an alternative carrier 700 to that of FIG. 1. The carrier includes an operator cabin 701, and an articulated swinging arm 702 to which a harvester head 703 (being generally configured in the manner of harvester head 5 described with reference to FIG. 1) is connected. The connection between the harvester head 703 and the swinging arm 702 includes a rotator 704. Further, the swinging arm 702 may rotate about point 705. The angle of the swinging arm 703 is used in the course of determining whether the orientation of the harvester head 703 is such that the operator cab 701 is within a saw hazard zone 706.

Similarly, it is envisaged that in some embodiments the operator cabin 701 may be configured to rotate such that it faces the center of the harvester head 703. Rotation of the operator cabin 701 may be taken into consideration when determining recommended control of the harvester head 703.

It should be appreciated that the predetermined location may not be a single point, but may include a space, or a plurality of spaces. The predetermined location can be the location of an operator cab from which the harvester head is controlled. However, it should be appreciated that this is not intended to be limiting, as the predetermined location may include other areas—such as the location of sensitive or costly equipment. In the context of a harvester head this may include exposed hydraulic hosing, for example.

Reference to an orientation sensor should be understood to mean any device or combination of devices by which the orientation of the harvester head about one or more axes may be determined.

In an embodiment, the harvester head may be supported by an arm mounted to a carrier vehicle or station. The connection between the arm and the harvester head may include a rotator which may be controlled to rotate the harvester head relative to the arm about a first axis. Further, the connection may include a frame which permits rotation of the harvester head about a different axis to that of the rotator. In doing so, the harvester head may take a number of orientations with regard to both vertical and horizontal.

In an embodiment, the orientation sensor may include at least one rotation sensor. The rotation sensor may be configured to output a signal indicative of the rotation or angular position of the harvester head about at least one axis—particularly with regard to rotation about a vertical axis.

The rotation sensor may be any suitable means known to a person skilled in the art. In an embodiment the rotation sensor (and other orientation sensors) may be a non-contact sensor.

Components used in or with harvester heads are generally exposed to harsh operating conditions—both in terms of the shock and vibration generated during use and operation of the head, and also the high levels of dust, dirt, and debris present in the surrounding environment. In such an environment it can be helpful to reduce the number of moving parts and mechanical linkages in order to eliminate likely points of failure. The use of a non-contact sensor may assist in achieving this. For example, the non-contact position sensor may be magnetoresistive, inductive, Hall effect based, optical, capacitive, or proximity based switching. However, it should be appreciated that reference to the sensors being non-contact sensors is not intended to be limiting, and other forms of sensors such as potentiometers and rotary encoders may be used with the present disclosure.

In an embodiment the orientation sensor may include at least one inclination sensor. It should be appreciated that the inclination sensor may be any suitable means known in the art for determining the angle of a device to a horizon—whether real or artificial. For example, the inclination sensor may be a pendulum tilt sensor, liquid pendulum tilt sensor, gas pendulum tilt sensor, micro-electro-mechanical system (MEMS) tilt sensor, or compounding tilt sensor.

In an embodiment at least one orientation sensor may be used to determine at least one angle of rotation of the arm to which the harvester head is connected relative to the carrier. This angle of rotation may be about a vertical axis—for example in the case of a swinging arm or boom. Further, the angle of rotation may be about a horizontal axis—for example at one of the articulated joints in the arm.

It should be appreciated that the angle of rotation may be inferred from linear measurements associated with other components of the arm. For example, the extent to which hydraulic rams used to operate the arm are extended may be used to determine the angle of rotation at each joint. The data regarding the orientation of the arm itself may be used together with data from other orientation sensors directly associated with the harvester head to determine the orientation of the harvester head relative to the predetermined location.

Similarly, in some embodiments the operator cab of the carrier vehicle may be configured to rotate. For example, the cab may rotate to face the center of the harvester head in order to maintain a clear view of the device. The orientation of the operator cab may be used in determining whether it is within the hazard zone.

In another embodiment, the orientation sensor may include a directional wireless device. Reference to a directional wireless device should be understood to mean any means by which an orientation of a first position relative to a base position may be determined by transmission of a wireless signal. It should be appreciated that proximity of the first position relative to the base position may be determined in addition to orientation.

For example, the directional wireless device may be part of a Radio Frequency Identification (RFID) system. The system may include transmitters and receivers as known in the art in order to facilitate communication between the various components of the system. For example, a directional antenna located on the carrier may be configured to emit an interrogation signal in a particular direction, with an RFID tag associated with the harvester head configured to emit an identification signal on receiving the interrogation signal—the identification signal subsequently being used to indicate the orientation of the harvester head relative to the carrier.

In an alternative embodiment, the directional wireless device may include electromagnetic wave transmitter configured to transmit within a window aligning with the hazard zone, for example a laser. The device may include a detector configured to determine when the electromagnetic wave is reflected from the predetermined location. Material with unique reflective properties may be used to demarcate the predetermined location, for example a window of an operator cab. It should be appreciated that this is not intended to be limiting, and that other forms of directional wireless devices may be used with the present disclosure.

In an embodiment, at least one recommended operation of the harvester head is determined based at least in part on whether the predetermined location is within the hazard zone.

It should be appreciated that the processor may directly or indirectly cause operation of the harvester head to be controlled in response to the determined recommended operation. For example, the processor may be one dedicated to performance of the present disclosure and configured to communicate the recommended operation to a control module configured to control operation of the harvester head. Alternatively, the processor may be integrated with the control system, and directly cause the recommended operation to be carried out.

In one embodiment, the orientation sensor may be configured to transmit a signal only when the harvester head is in a particular orientation. For example, the orientation sensor may include at least one proximity switch aligned with the predetermined location, with at least one trigger block aligned with at least one hazard zone. Orientation of the harvester head such that the proximity switch being activated may be indicative of the predetermined location being within the hazard zone.

The signal transmitted from such an orientation sensor may be subsequently processed to determine a recommended operation, or used to directly control at least one function of the harvester head associated with the hazard zone.

Reference to a hazard zone should be understood to mean the predetermined space within which a person or object is at risk of being injured or damaged by a particular operation of the harvester head—whether due to regular operation of the harvester head or malfunction of same. In particular, the hazard zone is envisaged as extending beyond the harvester head itself—as will be evident from the examples discussed further below. In an embodiment the hazard zone is determined based on the likely path of an object being propelled from the harvester due to at least one feature or operation of the harvester. In an embodiment the harvester head includes a cutting tool configured to cut through the stem.

The cutting tool includes at least one saw. In particular it is envisaged that the present disclosure may have particular application to timber-working devices including at least one chainsaw. However, this is not intended to be limiting as the saw may take other forms—for example a disc saw.

Harvester heads may include a main saw which is primarily used for the felling and cross cutting of stems. Further, some harvester heads may include a secondary or topping saw. The topping saw is typically of a lower specification than the main saw, and used primarily during processing once a tree is felled.

Each chainsaw may include a saw chain, a saw bar around which the saw chain moves, and a saw drive gear for driving the saw chain around the saw bar.

In an embodiment at least one hazard zone projects from the cutting tool. It is envisaged that the hazard zone may center about the saw drive gear, although it should be appreciated that this is not intended to be limiting. In an example embodiment wherein the cutting tool is a chainsaw, the hazard zone extends through the angle of rotation of the chainsaw about its pivot point in the plane aligning with the cutting plane of the cutting tool—i.e. the saw bar.

It should be appreciated that the hazard zone may take the structure of the timber-working device into account. For example, it is envisaged that the chainsaw of an example harvester head may rotate through a 93° angle, with the initial 5-7° contained within the harvester body. As such, the hazard zone may extend through the substantially 90° angle outside the body. Further, the hazard zone may extend through substantially 30° in the plane substantially lateral to the cutting plane. This angle is an industry standard with regard to chainsaws.

It should be appreciated that these angles are described by way of example only, and the hazard zone or zones implemented with the present disclosure may vary in light of various factors such as operating conditions, device configuration—for example saw speed, safety standards, organizational requirements and so on.

A hazard zone may project from either side of the cutting tool. This configuration may be particularly useful for defining the space within which chain shot may occur. In particular, such a hazard zone may define the area in which the greatest risk due to chain shot is present, while delimiting the space sufficiently to permit safe operation through as great a range of orientations as possible. It should be appreciated that this definition of the hazard zone is not intended to be limiting, and that other configurations of the hazard zone or zones associated with the cutting tool may be used with the present disclosure.

In an embodiment recommended operation of the harvester head includes disabling operation of the cutting tool when the location of the object tracking device is within the at least one hazard zone associated with the cutting tool.

The harvester head can include a drive mechanism including at least one driven roller configured to control the position of a stem held by the harvester head relative to the harvester head.

In an embodiment at least one hazard zone projects in at least one direction in which a stem is configured to be driven by the drive mechanism.

In an embodiment recommended operation of the harvester head includes controlling the drive mechanism when the location of the object tracking device is within the at least one hazard zone associated with the drive mechanism.

Control of the drive mechanism may include adjusting the speed of the drive mechanism. Further, control of the drive mechanism may include disabling operation of the drive mechanism. Disabling operation of the drive mechanism may include limiting operation to be in one direction, for example away from the operator's cabin.

In one embodiment the hazard zone may be adjusted depending on the current configuration or operation of the harvester head. For example, where the speed of the drive mechanism is variable the hazard zone associated with the feed operation may vary in accordance with the current feed through speed.

In another embodiment, the harvester head may be configured to determine the diameter of the stem being processed, and the hazard zone may be adjusted depending on the measured diameter.

It is envisaged that this adjustment of the hazard zone may be based on the physical dimensions of the stem such as width, or properties of the stem inferred from diameter such as mass. For example, stems with a greater mass may have a greater hazard area due to the greater momentum when feeding the stem using the drive mechanism.

In one embodiment the hazard zone may be adjusted depending on the length of the stem being processed by the harvester, whether measured or predicted. For example, with regard to the hazard zone or zones associated with the drive mechanism, the hazard zone may extend to at least the greatest length of the stem being processed. The hazard zone may include a buffer zone greater than the length of the stem—whether a set distance or proportional to the length of the stem.

In an embodiment the processor is configured to transmit notification of the operator cab being within a hazard zone to an operator device. The operator device may be, for example, a display, a siren, a strobe light, or any other sensory alarm. It is envisaged that the notification may be transmitted to a display such as a touchscreen used by the operator to monitor and control operation of the harvester head, as the operator is likely to be observing such a display. In one embodiment the notification may include the recommended operation of the harvester head. The system may be configured to allow an operator to authorize or override the recommended operation determined by the processor or carried out by the controller. Alternatively, the system may rely on the operator to manually perform the recommended operation.

The various illustrative logical blocks, modules, circuits, and algorithm steps described in connection with the embodiments disclosed herein may be implemented as electronic hardware, computer software, or combinations of both. In particular, they may be implemented or performed with a general purpose processor such as a microprocessor, or any other suitable means known in the art designed to perform the functions described.

The steps of a method or algorithm and functions described in connection with the embodiments disclosed herein may be embodied directly in hardware, in a software module executed by a processor, or in a combination of the two. If implemented in software, the functions may be stored as processor readable instructions or code on a tangible, non-transitory processor-readable medium—for example Random Access Memory (RAM), flash memory, Read Only Memory (ROM), hard disks, a removable disk such as a CD ROM, or any other suitable storage medium known to a person skilled in the art. A storage medium may be connected to the processor such that the processor can read information from, and write information to, the storage medium.

Example embodiments described in the present disclosure include the following:
   a. A method for operation of a timber-working device configured to perform at least one operation having an associated hazard zone, the method including the steps of: outputting at least one signal from at least one orientation sensor associated with the timber-working device, the signal indicating whether a predetermined location is within the hazard zone based on the orientation of the timber-working device; receiving the signal; and controlling the operation associated with the hazard zone based on the signal; and
   b. A timber-working system, including a timber-working device configured to perform at least one operation having an associated hazard zone; at least one orientation sensor configured to output at least one signal indicating whether a predetermined location is within the hazard zone based on the orientation of the timber-working device; and at least one controller configured to receive the signal and control the operation associated with the hazard zone based on the signal.

Aspects of the present disclosure have been described by way of example only and it should be appreciated that modifications and additions may be made thereto without departing from the scope thereof as defined in the appended claims. Thus, the following claims should be referenced with regard to the scope of the invention.

What is claimed is:

1. A method for operating a timber-working device, the method comprising the steps of:
   determining at least one hazard zone associated with the at least one operation of the timber-working device;
   transmitting an electromagnetic wave within a window aligned with the hazard zone from an electromagnetic wave transmitter of a directional wireless device of at least one orientation sensor associated with the timber-working device, wherein the directional wireless device comprises a detector configured to detect reflection of the electromagnetic wave from a predetermined location demarcated by a material with reflective properties, the directional wireless device of the at least one orientation sensor positioned on a moving element of the timber-working device and the moving element configured to perform one of moving and carrying a timber, the predetermined location separated from the moving element of the timber-working device;
   receiving at least one signal output from the orientation sensor indicative of whether the detector has detected reflection of the electromagnetic wave; and determining whether the predetermined location is within the hazard zone based on the signal received from the orientation sensor;

wherein the hazard zone is determined based on the likely path of an object being propelled from the timber-working device, and the predetermined location is a location of an operator cab.

2. The method of claim 1, further comprising determining at least one recommended operation of the timber-working device based at least in part on whether the predetermined location is within the hazard zone.

3. The method of claim 2, further comprising controlling operation of the timber-working device according to the recommended operation.

4. The method of claim 3, wherein the recommended operation of the timber-working device includes disabling operation of a cutting tool when the predetermined location is within the at least one hazard zone associated with the cutting tool.

5. The method of claim 3, wherein the recommended operation of the timber-working device includes controlling a drive mechanism when the predetermined location is within the at least one hazard zone associated with the drive mechanism.

6. The method of claim 5, wherein controlling the drive mechanism includes adjusting the speed of the drive mechanism.

7. The method of claim 5, wherein controlling the drive mechanism includes limiting the direction in which the drive mechanism may operate.

8. The method of claim 1, further comprising adjusting the at least one hazard zone based at least in part on the current configuration of the timber-working device.

9. The method of claim 1, further comprising transmitting notification of the predetermined location being within the hazard zone to an operator device.

10. A timber-working system, comprising:
a timber-working device configured to perform at least one operation;
at least one orientation sensor comprising a directional wireless device, wherein the directional wireless device comprises:
an electromagnetic wave transmitter configured to transmit an electromagnetic wave within a window aligned with at least one hazard zone associated with the at least one operation of the timber-working device; and
a detector configured to detect reflection of the electromagnetic wave from a predetermined location demarcated by a material with reflective properties, the directional wireless device of the at least one orientation sensor positioned on a moving element of the timber-working device and the moving element configured to perform one of moving and carrying a timber, the predetermined location separated from the moving element of the timber-working device;
wherein the orientation sensor is configured to output at least one signal indicative of whether the detector has detected reflection of the electromagnetic wave, the hazard zone is determined based on the likely path of an object being propelled from the timber-working device, and the predetermined location is a location of an operator cab; and
at least one processor configured to:
receive the signal from the orientation sensor;
determine whether the predetermined location is within the hazard zone based on the signal received from the orientation sensor.

11. The timber-working system of claim 10, further comprising a cutting tool configured to cut through a stem being processed by the timber-working device, wherein the at least one hazard zone projects from the cutting tool.

12. The timber-working system of claim 11, wherein the cutting tool includes at least one chainsaw comprising a saw chain, a saw bar around which the saw chain moves, and a saw drive gear for driving the saw chain around the saw bar.

13. The timber-working system of claim 12, wherein the at least one hazard zone centers about the saw drive gear.

14. The timber-working system of claim 12, wherein the at least one hazard zone extends through substantially 90° in a plane aligning with the saw bar.

15. The timber-working system of claim 12, wherein the at least one hazard zone extends through substantially 30° in a plane substantially lateral to a plane aligning with the saw bar.

16. The timber-working system of claim 11, wherein the at least one hazard zone includes a hazard zone projecting from either side of the cutting tool.

17. The timber-working system of claim 10, wherein the timber-working device includes a drive mechanism including at least one driven roller configured to control the position of a stem held by the timber-working device relative to the timber-working device.

18. The timber-working system of claim 17, wherein the at least one hazard zone includes a hazard zone projecting from the timber-working device in at least one direction in which a stem is driven by the drive mechanism.

* * * * *